US008118651B2

(12) United States Patent
Weichholdt et al.

(10) Patent No.: US 8,118,651 B2
(45) Date of Patent: Feb. 21, 2012

(54) CROP RESIDUE CHOPPING AND DISTRIBUTING ARRANGEMENT FOR A COMBINE

(75) Inventors: Dirk Weichholdt, Woelfling les Sarreguemin (FR); Oliver Klein, Saarlouis (DE); Mark L. Pearson, LeClaire, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/840,746

(22) Filed: Jul. 21, 2010

(65) Prior Publication Data
US 2011/0045884 A1 Feb. 24, 2011

(30) Foreign Application Priority Data
Aug. 20, 2009 (DE) .......................... 10 2009 028 764

(51) Int. Cl.
*A01F 12/30* (2006.01)
(52) U.S. Cl. ...................................... 460/111; 460/112
(58) Field of Classification Search .................. 460/111, 460/112; 416/200 R, 198 R, 201 A
See application file for complete search history.

(56) References Cited

U.S. PATENT DOCUMENTS

| 3,246,605 | A | * | 4/1966 | Fisher | 415/90 |
| 6,736,721 | B2 | * | 5/2004 | Niermann et al. | 460/112 |
| 7,297,053 | B2 | * | 11/2007 | Farley | 460/112 |
| 2007/0015556 | A1 | | 1/2007 | Johnson et al. | |

FOREIGN PATENT DOCUMENTS

| DE | 19908111 C1 | 2/1999 |
| DE | 102007037485 B3 | 3/2009 |
| WO | 03/071857 A1 | 9/2003 |
| WO | 2008/156419 A1 | 12/2008 |

OTHER PUBLICATIONS

European Search Report Oct. 20, 2010 (4 pages).

* cited by examiner

*Primary Examiner* — Alicia Torres

(57) ABSTRACT

A crop residue chopping and distributing arrangement has a straw chopper (60) and at least one impeller blower (100) arranged downstream of straw chopper (60), the impeller blower comprising throw paddles (102, 102') that can be set in rotation about an axis of rotation (108). The throw paddles (102, 102') extend in the axial direction only over a part of the axial dimension of impeller blower (100). Adjacent throw paddles (102, 102') that are offset angularly in the circumferential direction are respectively arranged offset in the axial direction.

9 Claims, 5 Drawing Sheets

CROP RESIDUE CHOPPING AND DISTRIBUTING ARRANGEMENT FOR A COMBINE

FIELD OF THE INVENTION

The invention relates to a crop residue chopping and distributing arrangement for a combine.

BACKGROUND OF THE INVENTION

Agricultural combines are large machines that harvest, thresh, separate and clean agriculturally raised crops bearing grain. The clean grain obtained is stored in a grain tank arranged on the combine. The threshed straw is generally either chopped and spread out on the field across the width of the chopping mechanism, or diverted around the straw chopper and deposited unchopped in a swath in order to be subsequently taken up in a bailer. The remaining crop residue at the rear outlet of the cleaning device, such as chaff and small pieces of straw, is distributed on the field by a chaff scattering device, or directed through the straw chopper and spread on the field.

DE 19908111 C1 describes a combine with a straw chopper and two impeller blowers following the straw chopper, arranged one alongside the other, for strewing the straw widely across the field. For the purpose of a material transfer that does not change direction, the outlet of the straw chopper and the inlet of the impeller blowers, which are arranged in a housing and have throw paddles rotating about a roughly vertical axis, are arranged in a single plane. Sheaths that join one another between the impeller blowers in a tip pointing towards the straw chopper are arranged around the impeller blowers. In the rear area, the sheaths are broken out in order to emit the straw onto the field. There is a covering above the impeller blower, while no cover is present on its underside.

A combine with a straw chopper is described in US 2007/0015556 A1 in which the outlet of the straw chopper acts from below at an acute angle on the downstream impeller blowers. There is a covering above the impeller blower, while no cover is present on its underside.

DE 10 2007 037 485 B3 shows a combine in which the straw chopper emits the crop residues in free flight and acts on the impeller blowers axially at an acute angle.

WO 2008/156419 A1 describes a similar arrangement of the straw chopper and impeller blower, but the crop flow is diverted downstream of the straw chopper by a deflection plate so that it strikes the impeller blower axially, but at a relatively acute angle. The central part of the crop residue flow is less strongly deflected than the outer part, in order that the velocity existing after the residue leaves the chopper is utilized to the best extent possible, in that the impeller blowers turning inwards with their front sides are acted on by the outer part of the crop residue flow in front of the axis of rotation, while the central part of the crop residue flow is thrown against the impeller blowers in the area behind the axis of rotation. The impeller blowers are arranged in housings that are open, apart from the deflection plates, on their axial end face where they are loaded, and are closed at the other end face.

In the above-mentioned prior art, the impeller blowers comprise throw paddles, mounted on central shafts, whose leading surfaces are flat and extend radially outwards up to the edge of the impeller blower and axially over the entire length of the shaft. In each case, a number of throw paddles are distributed around the shaft.

While relatively large gaps remain between the outlet of the straw chopper and the impeller blowers, through which the air conveyed by the straw chopper out of the interior of the combine and in particular, the air coming from the cleaner, can escape to the outside in the impeller blowers according to DE 19908111 C1, US 2007/0015556 A1 and DE 10 2007 037485 B3, this air must all be conveyed by the throw paddles in the impeller blowers according to WO 2008/156419 A1, since the crop flow is guided by the deflection plates between the straw chopper and the impeller blowers and no gap to the outside remains. This often results in conveyance problems, because the crop residues are not always removed in the desired manner due to the high air pressure that builds up at the inlet to the impeller blower. The high air pressure can spread to the cleaning device of the combine and result in unsatisfactory performance there as well.

SUMMARY OF THE INVENTION

The problem underlying the invention is to provide a crop reside chopping and distributing arrangement with a straw chopper and at least one impeller blower arranged downstream of the straw chopper for a combine in which the above-mentioned problems are avoided, or are at least present to a reduced extent.

This problem is solved according to the invention by the teaching of claim 1, while characteristics that further develop the invention in an advantageous manner are specified in the additional claims.

A crop residue chopping and distributing arrangement for a combine comprises a straw chopper and at least one impeller blower arranged downstream of the straw chopper in the direction of material flow. In harvesting mode, the straw chopper comminutes the crop residues fed to it, in particular, straw. It can also convey other crop residues such as chaff with its blades and optional additional conveying paddles, whether in common with the straw in the chopping mode, or selectively, only those residues in a straw swath-laying mode, in which the straw is led around the straw chopper. The crop residues conveyed by the straw chopper are taken up by the impeller blower and spread across the field. The impeller blower has throw paddles that can be set in rotation about an axis of rotation and extend axially over only a part of the axial dimension of the impeller blower. Adjacent throw paddles that are offset angularly in the circumferential direction are respectively arranged offset in the axial direction.

In this way the passage capacity of the impeller blower for air is improved, because the throw paddles do not extend over the entire height of the impeller blower, so that a gap, through which air conveyed by the straw chopper can pass, remains in their vicinity. The conveyance power for crops is not impaired, because adjacent throw paddles are arranged offset in the axial direction, so that the entire axial dimension of the impeller blower can continue to be provided with throw paddles. Thus the air can flow in the center of the axial dimension of the impeller blower via a curved path between the throw paddles.

The throw paddles preferably extend in the axial direction over at least half the axial dimension of the impeller blower. An axial end of each of the throw paddles can end flush with the impeller blower and extend, for example, to the axial end of a central shaft which the throw paddles radially adjoin.

Preferably two impeller blowers rotating in opposite directions are arranged side by side. The direction of rotation is arbitrary, but it has proven successful if the areas of the impeller blowers facing the straw chopper rotate to the inside.

With respect to the relative arrangement of the straw chopper and the impeller blowers, there are different possibilities within the scope of the inventive conception. Thus the straw chopper can act on the impeller blower precisely in the radial direction (cf. DE 19908111 C1) or on the radially outer edge of the impeller blower at an acute or obtuse angle (see US 2007/0015556 A1) or the crop residues are fed to the impeller blower axially at an acute or obtuse angle with deflection (see WO 2008/156419 A1) or without deflection (see DE 10 2007 037485 B3) of the crop residue downstream of the straw chopper by a deflection element. A gap open to the environment can remain between the straw chopper and the impeller blower, or a crop residue guide element can be placed between the outlet of the straw chopper housing, provided with a concave bottom, and the impeller blower, which element can be constructed as a pure guide element and not deflect the crop stream, or can deflect it in a desired direction as is described, in particular, in WO2008/156419 A1.

BRIEF DESCRIPTION OF THE DRAWINGS

An exemplary embodiment of the invention will be described with reference to the drawings.

DETAILED DESCRIPTION OF THE PREFERRED EMBODIMENT

Figure 1:
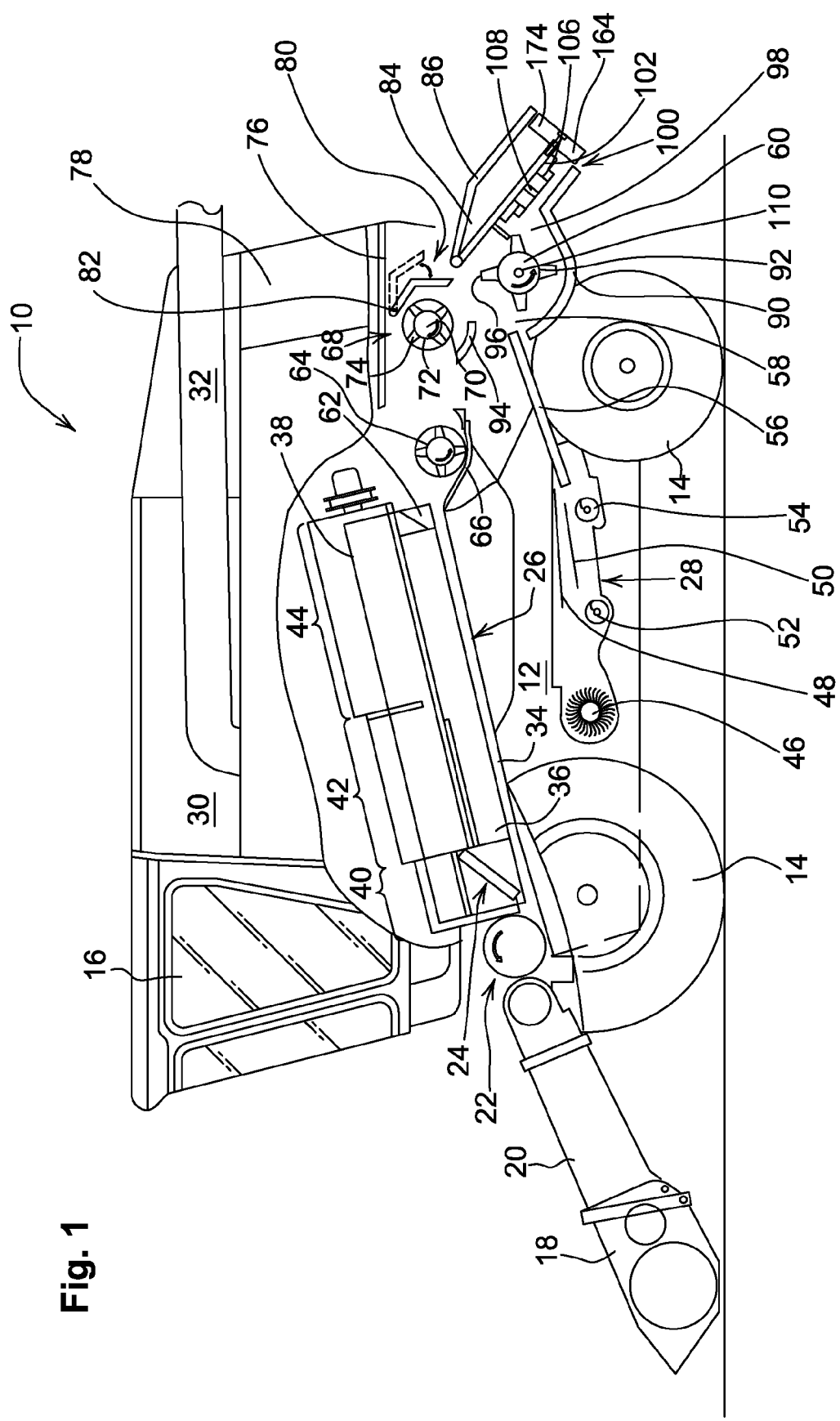
FIG. 1 shows a partially cut away side view of a combine with a straw chopper and impeller blowers.

FIG. 1 shows an agricultural combine 10 with a chassis 12 with wheels 14 engaged with the ground that are mounted on chassis 12 and serve to propel combine 10 in the forward direction, which runs to the left in FIG. 1. The operation of combine 10 is controlled from the operator cab 16. A cutting mechanism 18 is used to harvest crops containing grain and supply it to an inclined conveyor 20. The harvested crop is supplied by inclined conveyor 20 to a guide drum 22. Guide drum 22 directs the crop through a transitional section 24 to an axial crop processing device 26. Directional indications such as front and back refer below to the forward direction of combine 10, which runs to the left in FIG. 1.

Crop processing device 26 comprises a rotor housing 34 and a rotor 36 arranged therein. Rotor 36 comprises a hollow drum 38 on which crop processing elements for a loading section 40, a threshing section 42 and a separation section 44 are mounted. Loading section 40 is arranged on a front side of the axial crop processing device 26. Threshing section 42 and separation section 44 lie downstream and to the rear of loading section 40 in the longitudinal direction. Drum 38 has the shape of a truncated cone in loading section 40. Threshing section 42 comprises a front section in a truncated conical shape and a cylindrical rear section. The cylindrical separation section 44 of drum 38 is situated at the end of axial crop processing unit 26. In place of an axial crop processing unit 26, a tangential threshing drum and an axial separation device or straw shaker following it can also be used.

Grain and chaff that fall through a threshing basket associated with threshing section 42 and a separation grating associated with separation section 44, are fed to a cleaning system 28 with a fan 46 and planar screens 48, 50 that can be set into a vibrating motion. Cleaning system 28 removes the chaff and feeds the clean grain via a screw conveyor 52 to an elevator for clean grain (not shown). The elevator for clean grain deposits the clean grain in a grain tank 30. The clean grain in grain tank 30 can be discharged by a discharge screw conveyor 32 onto a grain wagon, trailer or truck. Crop remaining at the rear end of the lower planar screen 50 is fed by means of a screw conveyor 54 and a return conveyor (not shown) back to crop processing unit 26. The crop residues deposited at the rear end of upper planar screen 48, which consist essentially of chaff (husks) and small straw particles, are conveyed by a vibrating conveyor 56 backwards into an inlet 58 of a straw chopper 60.

Threshed straw exiting from separation section 44 is ejected from crop processing unit 26 through an outlet 62 and fed to a throw drum 64. The throw drum 64, cooperating with a floor 66 arranged underneath it, ejects the straw to the rear. To the rear of throw drum 64 and roughly at the vertical height of its axis of rotation, there is an additional conveyor in the form of an overshot drum conveyor 68. Drum conveyor 68 runs horizontally and transverse to the forward direction and can be set by a suitable drive unit into rotation about its axis 70, with which it is mounted rotatably on chassis 12, in a direction in which it operates in an overshot manner and rotates clockwise in FIG. 1, as indicated by the arrow. A hydraulic motor is generally used to drive drum conveyor 68. Drum conveyor 68 corresponds in construction to throw drum 64 and comprises a rotationally symmetrical jacket 72 with catches 74 distributed about its periphery and rigidly mounted thereon. A trough 94 is arranged underneath drum conveyor 68.

Above throw drum 64 and drum conveyor 68, an upper wall 76 is arranged that extends horizontally and in the forward direction and closes off an engine compartment 78 above it from the rear. At the front end of wall 76 facing drum conveyor 68, a flap 80 is pivotably articulated between a swath-laying position and a chopping position about a shaft 82 extending horizontally and transverse to the forward direction. Flap 80 is curved concavely, the radius being matched to drum conveyor 68.

Underneath the lower and rear end of flap 80 (with flap 80 in the chopping position), a metal sheet 84, fixedly connected to chassis 12, continues without a gap, extending at an incline backwards and downwards and connected to an adjoining chute 86, on which the straw can slide onto the ground in the field during swath-laying mode. The straw swath can be brought into a desired form by runners or straw guides (not shown) arranged on the upper side of chute 86.

Flap 80 can be pivoted about shaft 82 between the chopping position, in which it is shown with solid lines in FIG. 1, and a swath-laying position, in which flap 80 is shown with dash-lines in the figure, extending backwards above the flow of straw.

Underneath the sheet 84 is the straw chopper 60, composed of a straw chopper housing 90 and a rotor 92 arranged therein, rotatable about a shaft running transverse to the forward direction and horizontally, with swinging suspended chopping blades 96 distributed around the circumference of rotor 92. Additional throw paddles (not shown) can be mounted on rotor 92, or some or all chopping blades 96 can comprise throw paddles for air conveyance. Downstream of outlet 98 of straw chopper 60, two impeller blowers 100, of which only a single one is shown in FIG. 1, are arranged side by side under chute 86. Impeller blowers 100 comprise a number of throw paddles 102, 102', each capable of being set in rotation by a respective hydraulic motor 106 about its axes of rotation 108

(running roughly vertically, but slightly inclined backwards and upwards), to which throw paddles straw chopper 60 feeds the crop residues axially from below at an obtuse angle to the axes of rotation of impeller blowers 100.

The axis of rotation 110 of rotor 92 of straw chopper 60 runs horizontally and transverse to the forward direction. The impeller blowers 100 are arranged one alongside the other to the side of and behind straw chopper 60. The impeller blowers 100 are situated inside the width of straw chopper 60. The impeller blowers 100 are fixed by holders (not shown) to frame 12 of combine 10 and/or to chute 86. It would also be possible to arrange straw chopper 60 and impeller blowers 100 in such a manner that straw chopper 60 acts on impeller blowers 100 from above. In another embodiment, the axes of rotation 108 of impeller blowers 100 are horizontal or exactly vertical.

In the swath-laying position of flap 80, straw chopper 60 conveys only the crop residues from cleaning system 28 to impeller blowers 100, which distribute them on the soil of the field across the width of cutting mechanism 18. In chopping mode, straw chopper 60 comminutes the straw on outlet 62 of crop processing unit 26, which is thrown by throw drum 64 and drum conveyor 68 against flap 80 and then falls down into inlet 58 of straw chopper 60.

Figure 2:
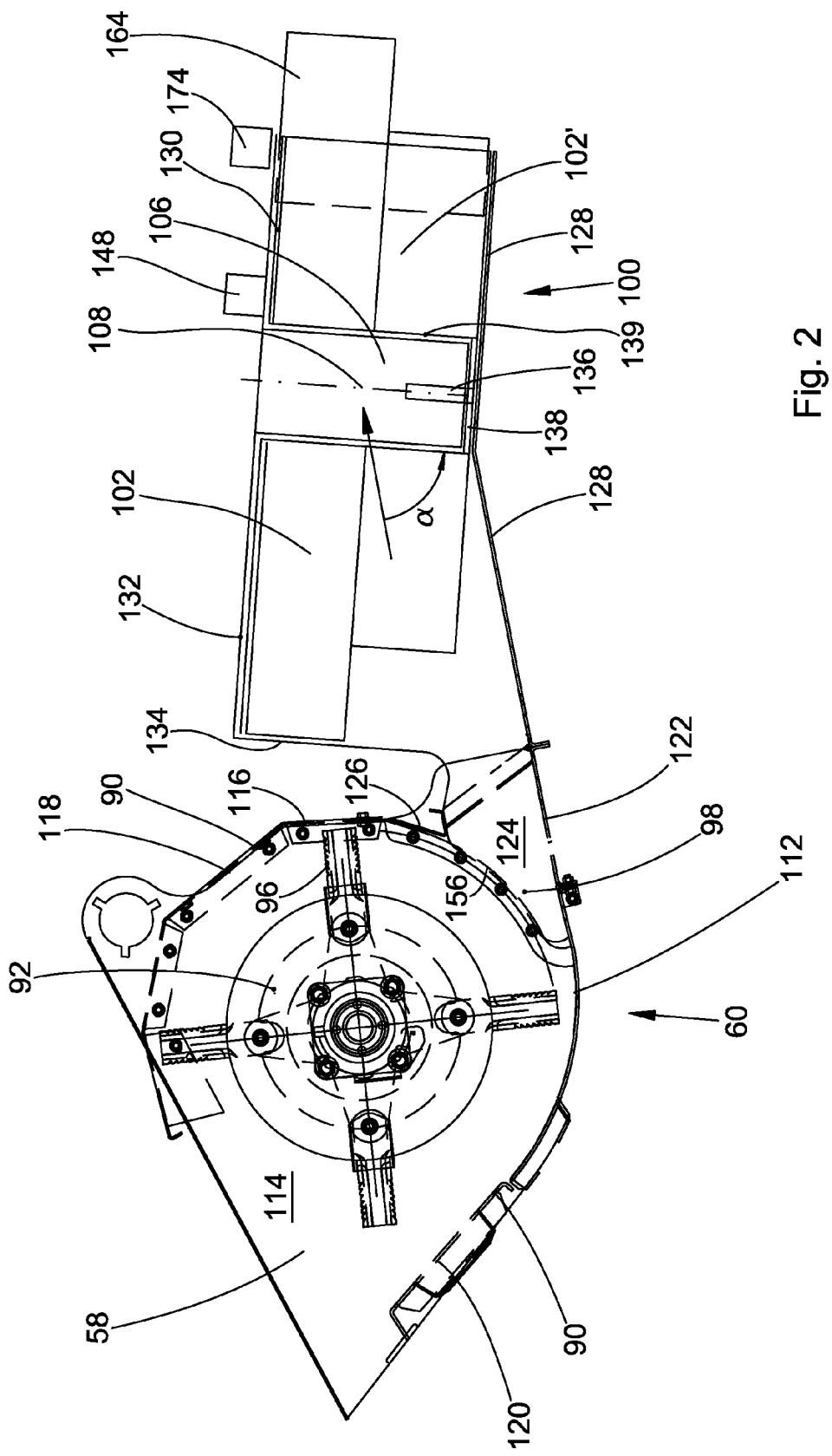
FIG. 2 shows an enlarged side view of the straw chopper and one impeller blower.
Figure 3:
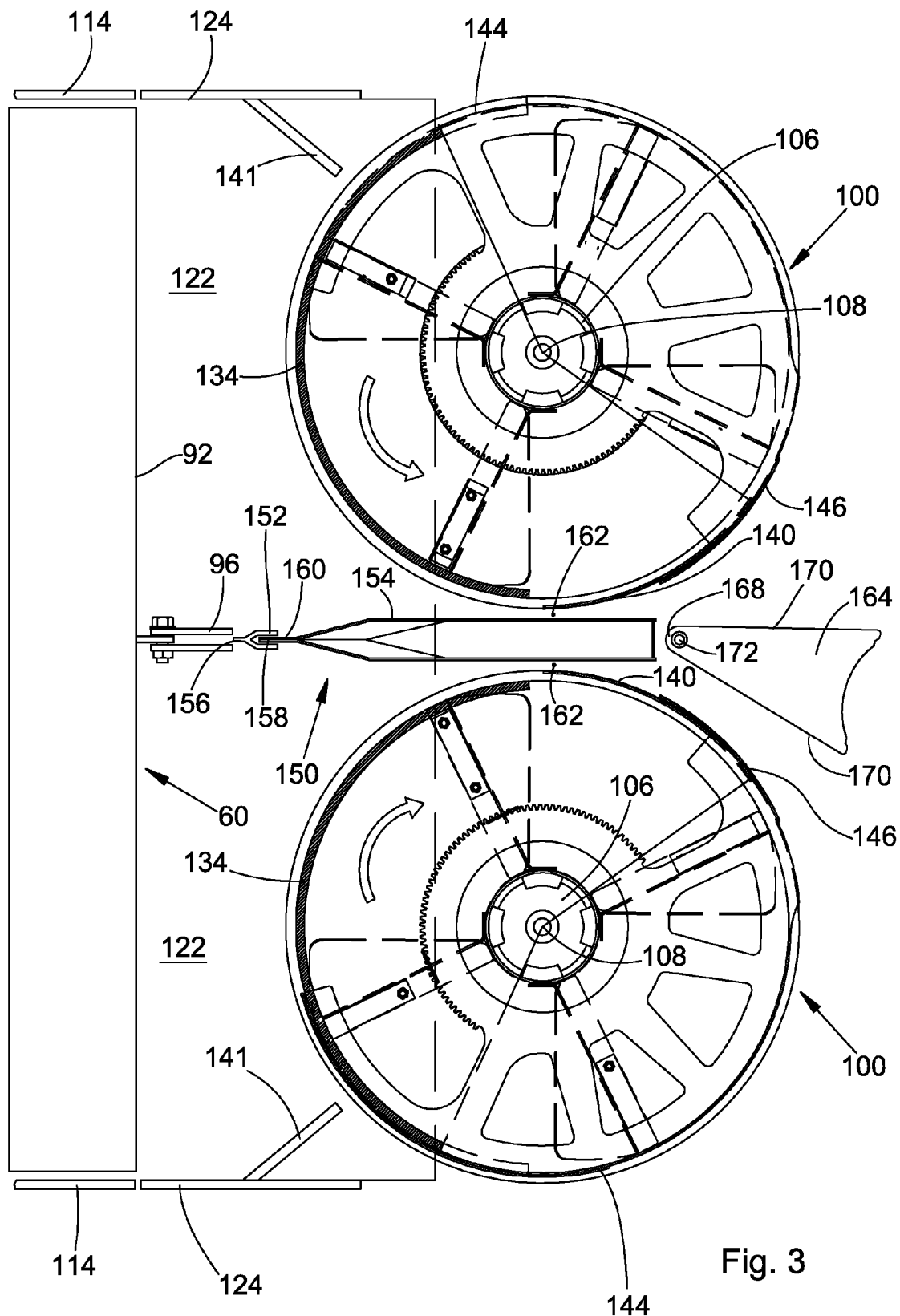
FIG. 3 shows a plan view onto the straw chopper and the impeller blowers.

We now refer to FIGS. 2 and 3, in which the crop residue chopping and distributing arrangement of combine 10 is illustrated in a side view (FIG. 2) and plan view (FIG. 3). The crop residue chopping and distributing arrangement comprises straw chopper 60 and impeller blowers 100. Straw chopper housing 90 comprises a base 112, two side walls 114 and additional transverse metal sheets 116, 118, 120 which, like floor 112, connect the side walls 114 to one another and surround rotor 92. Base 112 is arranged on the underside of straw chopper housing 90 and encloses the envelope circle defined by chopper blades 96, with a radius leaving relatively little clearance. Opposing blades (not shown) that are mounted on straw chopper housing 90 and penetrate into the envelope circle of chopper blades 96 in order to effectively comminute the crop residues can also be provided.

Figure 4:
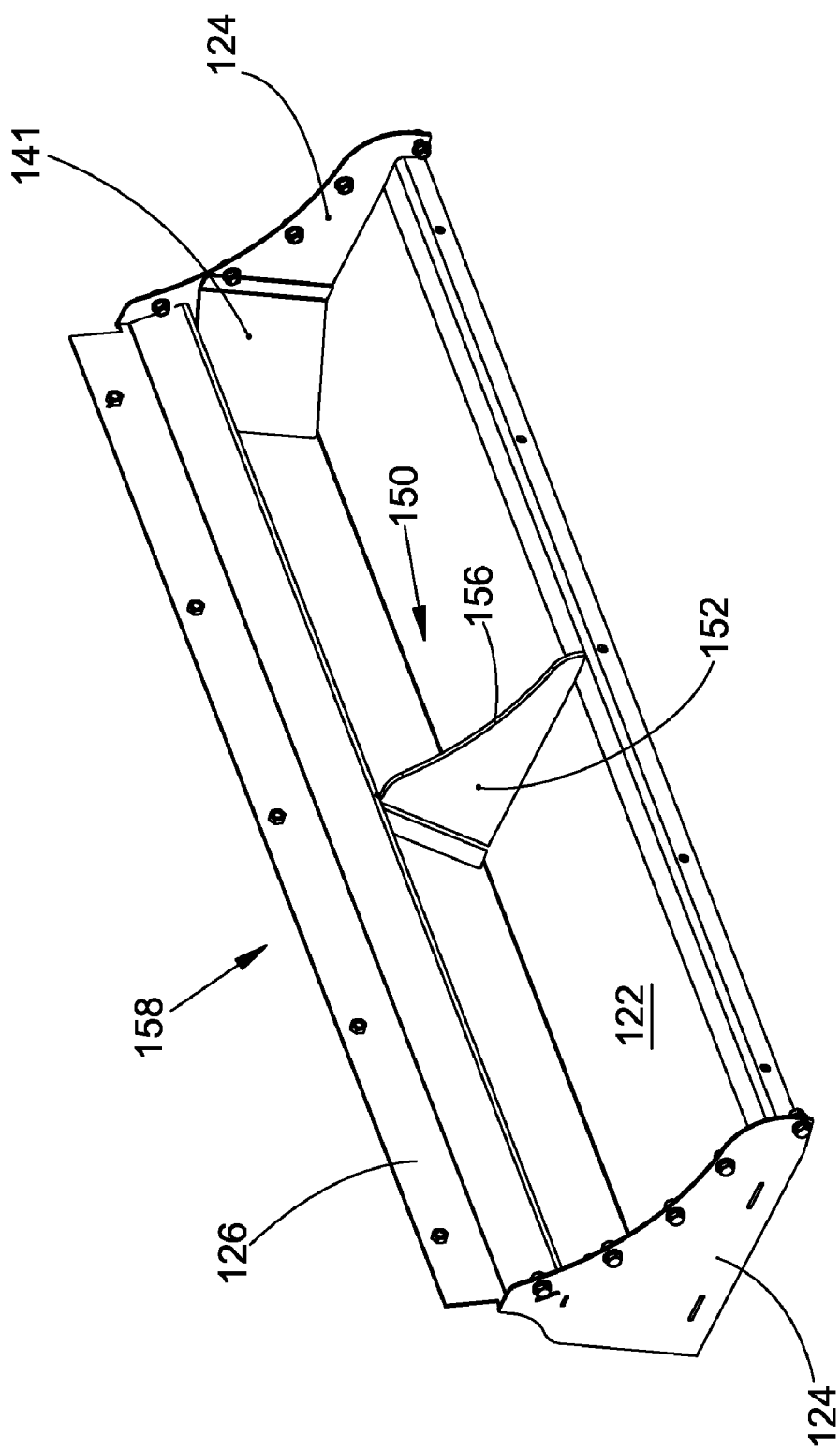
FIG. 4 shows a perspective view of a crop residue guide element.

A crop residue guide element 122, shown in a perspective view in FIG. 4, adjoins base 112 in the flow direction of the crop residues. Crop residue guide element 122 is arranged between side wall extensions 124 that are joined to a respective side wall 114 of straw chopper housing 90 by threaded connections and run parallel to it. Crop residue guide element 122 is itself flat (accordingly has a radius of ∞). Crop residue guide element 122 is angled downwards at its front end in order to form a flange that is bolted to a flange, likewise angled downwards, on the rear side of base 112. Projecting edges at which the crop residues could collect are avoided by this connection. A cross plate 126 that delimits outlet 98 of straw chopper 60 towards the top is mounted on the top of side wall extensions 124. A cross plate 116 of straw chopper housing 90 adjoins cross plate 126 at the top. It may additionally be noted that crop residue guide element 122 could be integrally produced with base 112, just as side wall extensions 124 could be integrally produced with side walls 114. The illustrated, two-part embodiment can, however, use straw chopper 60 without crop residue guide element 122 and side wall extensions 124 (or with a different crop residue guide element and different side wall extensions, not shown) in combination with a distributor base with adjustable guide plates.

On the side wall extensions 124 (see FIG. 4), outer guide elements 141 are fastened that extend inwards and backwards by roughly 45°. They are rectangular in a top view and can be bent over their entire length or only in a front area adjoining a plate connected to side wall extension 124 and running parallel to it. In the vertical direction, outer guide elements 141 are flat. It would also be possible to mount the outer guide elements 141 additionally or only on crop residue guide element 122. They could also be formed in the shape of a plowshare or a runner.

An angled-off bottom plate 128 that extends from a position just in front of the axes of rotation to the back end of the impeller blowers is arranged on the underside of impeller blowers 100. Bottom plate 128 has a front section that runs in the plane of crop residue guide element 122 and rests with a flange bent downward against a downward-bent flange of crop residue guide element 122. These flanges can either be bolted together or only rest against one another in order to make it easier for the impeller blowers 100 to be brought into the transport position separately from straw chopper 60. The front section of bottom plate 128 extends from the aforementioned flange to just in front of rotational axis 108 of impeller blowers 100 and transitions there into a rear section that runs up to a position below the rear end of impeller blowers 100 and/orthogonally to axis of rotation 108.

Figure 5:
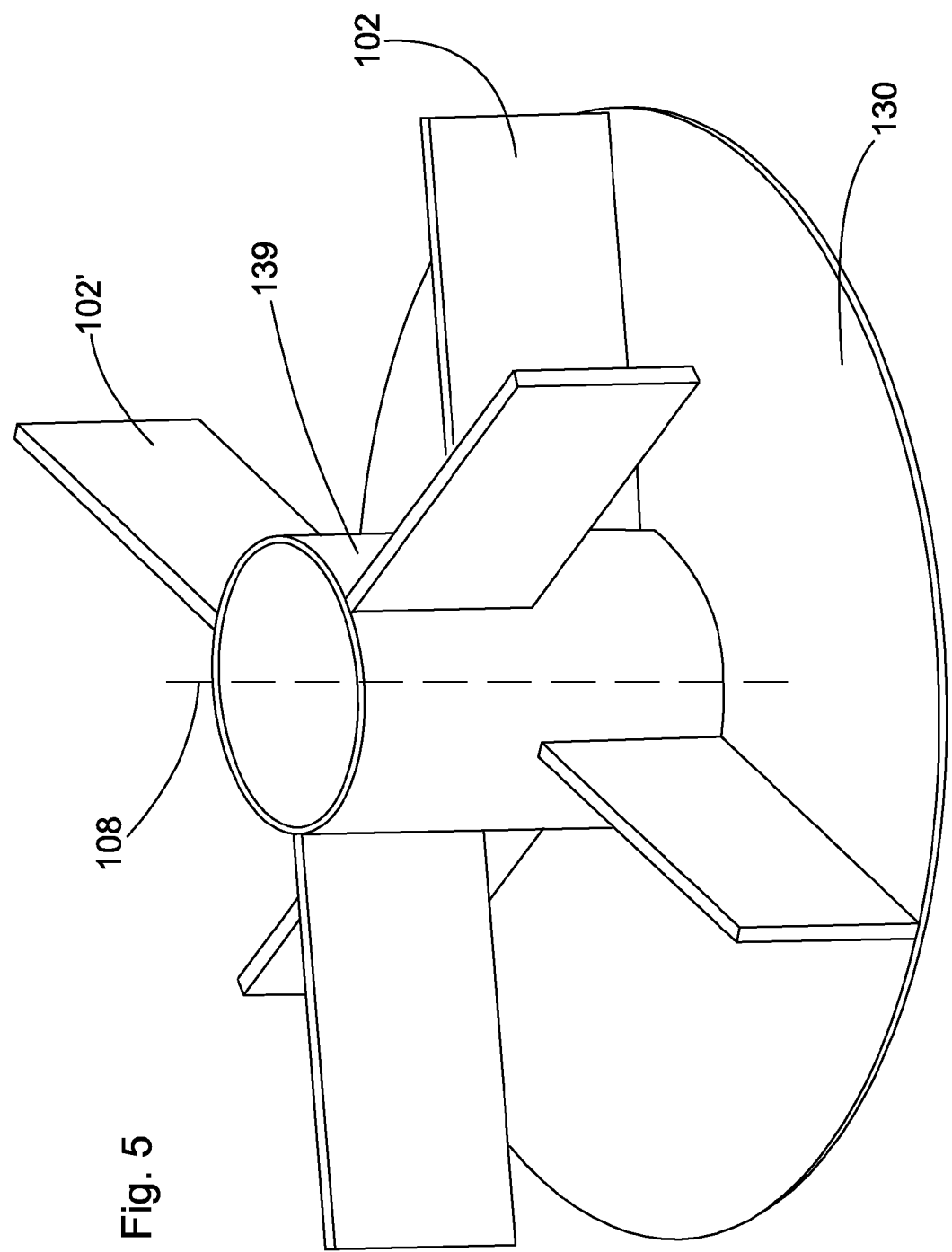
FIG. 5 shows a perspective view of a rotary plate of the impeller blower with throw paddles.

We now refer to FIGS. 2 and 5, FIG. 5 showing a perspective view of the throw paddles 102, 102' of a impeller blower 100 and their placement from the bottom, i.e, impeller blower 100 has been turned over in comparison to FIG. 2. The lower output shafts 136 of the hydraulic motors 106 mounted on cover 132 drive throw paddles 102, 102' via a cross link 138 and a cylindrical shaft 139, which is fixed at its upper end to a plate 130 with a central opening. The throw paddles 102, 102' of impeller blower 100 each extend over one half of the axial dimension of shaft 139, and successive throw paddles 102, 102' in the circumferential direction, offset by 60° in each case in the embodiment shown, are arranged offset in the axial direction. The upper throw paddles 102 contact plate 130 with their upper sides, or are fixed thereto (e.g., welded on). The lower throw paddles 102' are fixed only to shaft 139 (e.g., welded on) and are aligned flush with shaft 139 on their undersides.

Above plate 130 there is a cover 132 that covers impeller blowers 100 at the top, on the front side of which cover two partial sheaths 134 enclosing a respective impeller blower 100 semicircularly towards the front are arranged. Additional partial sheaths 140 connect up with the adjacent interior sides of impeller blowers 100, with gaps remaining between partial sheaths 134 and partial sheaths 140.

Between the two impeller blowers 100, there is a two-part guide element 150, comprising a front part 152 and a rear part 154. The front part 152 is mounted on crop guide element 122 and adapted at its front tip 156 to the envelope circle of chopping blades 96, so that it is formed across its tip 156 adjacent to the envelope circle of chopping blades 96 in a circular arc shape and this tip 156 is arranged a relatively short distance away from the envelope circle of the chopping blades 96. On its rear side, front part 152 forms a slot 158 into which a flat front plate 160 of rear part 154 penetrates. Behind front plate 158, rear part 154 widens and is hollow. Rear part 154 is mounted on the underside of cover 132 and on the upper side of bottom plate 128, which with partial sheaths 134, 140 and shields 144, 146, forms a impeller blower housing.

Based on FIG. 3 it is clear that, between guide element 150 and the adjacent partial sheaths 134, 140 of impeller blowers 100, there are passages 162, through which a part of the crop residue flow emitted in the central area of straw chopper 60 can flow from straw chopper 60 backwards all the way onto the field.

At the rear of rear part 154 of guide element 150, a movable guide element 164 is provided, with a front tip 168, situated in the gusset area of impeller blowers 100 behind the axes of rotation 108, and with two divergent straight lateral walls 170, each arranged adjacent to a impeller blower 100. Movable guide element 164 can be set into an oscillating motion about a front axis 172 running parallel to axes of rotation 108 of impeller blowers 100 by a drive unit 174 mounted above cover 132 to the rear of hydraulic motors 106. In this regard, we refer to DE 10 2007 037 485 B3 and DE 10 2008 055 003 A1, the disclosure of which is hereby incorporated by reference into the present documents.

The partial sheaths 140 are furnished with a higher rear section and a lower front section, between which an inclined area is provided.

At their rearward ends, partial sheaths 140 can be provided selectively with shorter or longer angled areas by positioning first and second shields 144, 146 with different dimensions in the circumferential direction at the rear ends of partial sheaths 140 by means of an adjusting drive 148 controlled manually by the operator from the cab 16, or independently as a function of the position of flap 80, in order to deflect the crop residues outward to a greater or lesser extent by covering impeller blowers 100 and preventing the free ejection of crop residues radially outwards, so that the crop residues can only leave impeller blowers 100 after they have passed shields 144 or 146. In swath-laying mode, the chaff can be deposited alongside the swath by moving the first, longer shield 144 to the rear inner end of partial sheath 140, or in straw chopping mode, the crop residues are uniformly spread across the field by moving the second, shorter shield 146 to the rear inner end of partial sheath 140. In addition, shields 144, 146 of the two impeller blowers 100 can be adjusted independently of one another in order to compensate for side wind and/or slope effects.

According to all of this, the function of the crop residue chopping and distributing arrangement in the harvesting operation is as follows. The crop residues, consisting of chaff and, in the position of flap 80 shown in FIG. 1, of straw, reach the straw chopper 60 through inlet 58 and are ejected there through outlet 98, possibly comminuted in cooperation with (opposing blades, not shown) by the chopping blades 96. The crop residues flow above crop residue guide element 122 and, at an angle $\alpha$ of roughly 55° to the axis of rotation 108 of impeller blower 100, strike the throw paddles 102, 102'. The axially offset arrangement of throw paddles 102, 102' has the advantage that, between plate 130 and lower throw paddles 102' and between bottom plate 128 and upper throw paddles 102, relatively large gaps remain in each case, through which the air conveyed by fan 46 and straw chopper 60 can flow out without problems, perhaps on a meandering path. Thereby the problems of conveying the crop residue through the air building up between straw chopper 60 and impeller blowers 100 are avoided.

The invention claimed is:

1. A crop residue chopping and distributing arrangement with a straw chopper (60) and at least one impeller blower (100), arranged downstream of straw chopper (60), that comprises a shaft and a first set of throw paddles (102. 102') attached to the shaft that can be set in rotation about an axis of rotation (108) of the shaft, in which the first set of throw paddles (102, 102') extend along the shaft in the axial direction only over a part of the axial dimension of impeller blower (100), and a second set of adjacent throw paddles (102, 102'), attached to the shaft and angularly offset in the circumferential direction relative to the first set of throw paddles and arranged on the shaft offset in the axial direction relative to the first set of throw paddles to create a meandering air flow path through said first set of throw paddles and said second set of adjacent throw paddles.

2. The crop residue chopping and distributing arrangement according to claim 1, in which throw paddles (102, 102') extend in the axial direction over approximately half the axial dimension of impeller blower (100).

3. The crop residue chopping and distributing arrangement according to claim 1, in which an axial end of each throw paddle (102, 102') terminates flush with impeller blower (100).

4. The crop residue chopping and distributing arrangement according to claim 1, in which impeller blower (100) is equipped with a central shaft (139) which the throw paddles (102, 102') adjoin in the radial direction.

5. The crop residue chopping and distributing arrangement according to claim 1, in which two impeller blowers (100), arranged side by side and rotating in opposite directions, are provided.

6. The crop residue chopping and distributing arrangement according to claim 5, in which, with their sides facing straw chopper (60), impeller blowers (100) rotate to the inside.

7. The crop residue chopping and distributing arrangement according to claim 1, in which straw chopper (60) is arranged in such a manner that in operation it acts on impeller blower (100) at an angle ($\alpha$) in the axial direction.

8. The crop residue chopping and distributing arrangement according to claim 1, in which straw chopper (60) is arranged inside a straw chopper housing (90) with a concave bottom (112), and in that a flat crop residue guide element (122), deflecting the crop flow or not deflecting it, is arranged between a floor (112) of straw chopper housing (90) and impeller blowers (100).

9. A combine (10) with a crop processing device (26) and a crop residue chopping and distributing arrangement, the crop residue chopping and distributing arrangement comprising a straw chopper (60) and at least one impeller blower (100) arranged downstream of the straw chopper (60), the at least one impeller blower (100) comprising a shaft and a first set of throw paddles (102. 102') attached to the shaft that can be set in rotation about an axis of rotation (108) of the shaft, wherein the first set of throw paddles (102, 102') extend in the axial direction only over a part of the axial dimension of impeller blower (100), and further wherein a second set of adjacent throw paddles (102, 102') are angularly offset in the circumferential direction about the shaft relative to the first set of throw paddles and are arranged on the shaft offset in the axial direction relative to the first set of throw paddles.

* * * * *